F. KELLER & C. FREY.

Jewelry Base.

No. 8,413. Reissued Sept. 10, 1878.

Witnesses

Otto Ahfeland

W. C. Hauff.

Inventors.

Frank Keller

Charles Frey.

by

Van Santvoord & Hauff their attorneys

N. PETERS, PHOTO-LITHOGRAPHER, WASHINGTON, D. C.

UNITED STATES PATENT OFFICE.

FRANK KELLER AND CHARLES FREY, OF NEW YORK, N. Y.

DESIGN FOR A JEWELRY-BASE.

Specification forming part of Design No. 9,941, dated April 24, 1877; Reissue No. 8,413, dated September 10, 1878; application filed July 17, 1878.

*To all whom it may concern:*

Be it known that we, FRANK KELLER and CHARLES FREY, both of the city, county, and State of New York, have invented a new and original Design for Jewelry-Bases, of which the following is a specification, reference being had to the accompanying drawing, in which—

Figure 1:
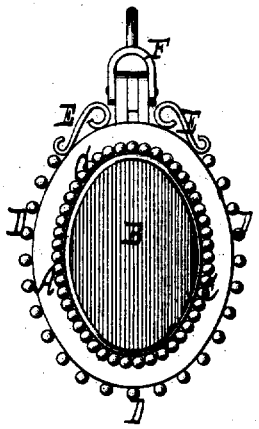
Figure 2:
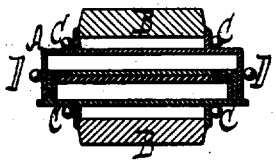

Figure 1 represents a face view of a locket containing our design. Fig. 2 is a cross-section thereof.

Similar letters indicate corresponding parts.

Our invention consists of a design for the bases of articles of jewelry, and will be hereinafter particularly described, and its distinctive features pointed out in the claims.

In the drawing, the letter A designates the base or border, and B is a central shield or face formed on each of the surfaces thereof. D is a row of beads arranged on the edge of the base or border A, and beyond the same, said beads being separated from each other by intervening spaces; and C is a row of beads arranged around each of the central shields B. These beads C hug each other and rest on the surfaces of the base or border A, as clearly shown in Fig. 2. E E are scrolls arranged on the edge of the base or border A in addition to the beads D, said scrolls being on the upper portion of the base and on opposite sides of a pendant, F.

What we claim is—

1. The design for a jewelry-base, consisting of the base or border A and row of beads D, surrounding and projecting from its outer edge and beyond the same, substantially as described, and shown in the accompanying drawing.

2. The design for a jewelry-base, consisting of the base or border A and row of beads D, surrounding and projecting from its outer edge and beyond the same, and separated by clear intervening spaces, substantially as described, and shown in the accompanying drawing.

3. The design for a jewelry-base, consisting of the base or border A, central shield or face B, the beaded rim C, surrounding said central shield, and beads D, projecting from the outer edge of the said base or border and beyond the same, substantially as described, and shown in the accompanying drawing.

4. The design for a jewelry-base, consisting of the base or border A, projecting beads D, and scrolls E, substantially as described, and shown in the accompanying drawing.

5. The design for jewelry-base, consisting of the base or border A, central shield or face B, the beaded rim C, surrounding said central shield, and the beads D and scrolls E, projecting from the outer edge of the base or border, substantially as described, and shown in the accompanying drawing.

In testimony that we claim the foregoing we have hereunto set our hands and seals this 13th day of July, 1878.

FRANK KELLER. [L. S.]
CHARLES FREY. [L. S.]

Witnesses:
W. HAUFF,
E. F. KASTENBUBER.